Oct. 4, 1966  K. W. TANTLINGER ETAL  3,276,112
METHOD AND APPARATUS FOR MAKING INTEGRAL RIVET CONNECTIONS
Filed April 6, 1964

INVENTOR.
KEITH W. TANTLINGER
WILLIAM R. LOWE
BY
Millman and Jacobs
ATTORNEYS

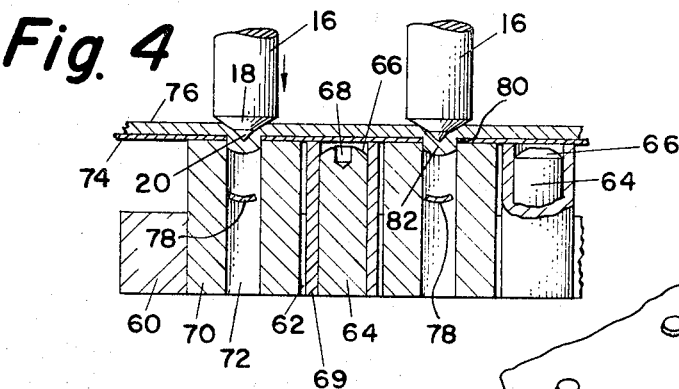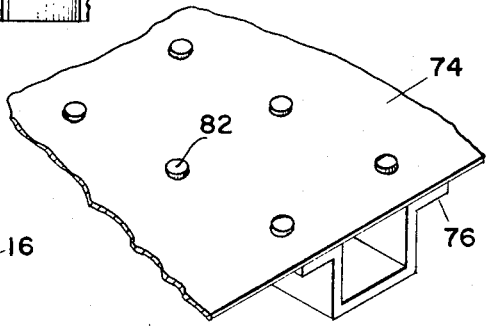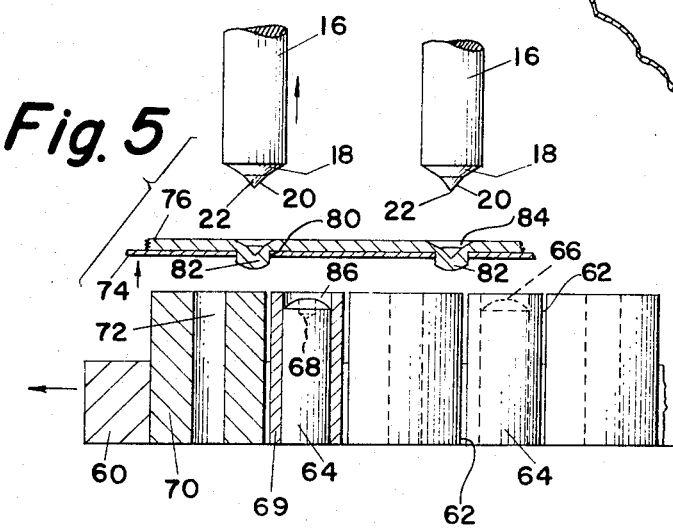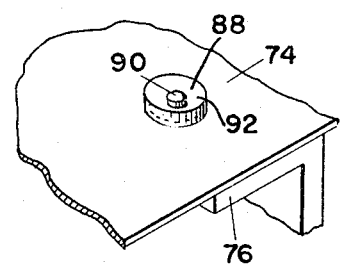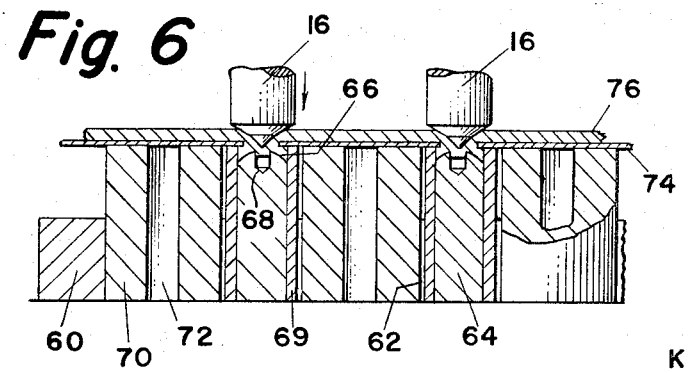

United States Patent Office 3,276,112
Patented Oct. 4, 1966

3,276,112
METHOD AND APPARATUS FOR MAKING
INTEGRAL RIVET CONNECTIONS
Keith W. Tantlinger, Grosse Pointe Shores, and William
R. Lowe, Franklin Village, Mich., assignors to Fruehauf
Corporation, Detroit, Mich., a corporation of Michigan
Filed Apr. 6, 1964, Ser. No. 357,714
11 Claims. (Cl. 29—432)

This invention relates to integral rivet connections.

It is known in the art as illustrated by the Schmidt Patent No. 2,713,197, that juxtaposed thicknesses of metal may be joined by integral rivets formed in two steps. In the first, a punch is applied to the upper thickness in such a manner as to knock a slug out of the lower thickness and force a round-ended projection of the upper thickness through the hole thus formed in the lower thickness. In the second, the round-ended projection is spread beyond the circumference of the hole to form a rivet head. Each such integral rivet is formed in a separate and individual operation. However, where a plurality of such connections is required over considerable lengths of materials, such as when side panels or sheets are connected to each other and/or to posts in trailer bodies, such an individual rivet-forming operation is not only lacking in efficiency but also can cause curling and differential displacement of material.

Accordingly, it is the primary object of the invention to provide a method and apparatus for making a plurality of integral rivet connections safely, accurately and efficiently.

Another object of the invention is to provide a method and apparatus for making a plurality of integral rivets employing a vertically movable member carrying a plurality of punches and a laterally shiftable member formed with alternating die and anvil stations whereby a plurality of integral rivet connections can be readily and accurately made between juxtaposed materials placed on said shiftable member by an operation in which the vertical strokes of the punch member and the lateral strokes of the shiftable member are timed to rapidly and sequentially cause the punches to knock out the slugs and form the projections at the die stations and then upend the projections to form the rivet heads at the anvil stations.

Yet another object of the invention is to provide a method and apparatus of the character described in which the anvils are so shaped as to effectively displace material towards the outer periphery of the rivet and at the same time prevent the punches from piercing through the rivet at the heading or upending operation.

These and other objects of the invention will become more apparent as the following description proceeds in conjunction with the accompanying drawings, wherein:

FIG. 4 is an enlarged fragmentary sectional view of the apparatus and illustrating the first stage in the operation;

FIG. 4A is a fragmentary perspective view of the product, inverted, resulting from the first stage;

FIG. 5 is a view similar to FIG. 4 and illustrating the second or shifting stage in the operation;

FIG. 6 is a view similar to FIG. 4 and illustrating the final or heading stage in the operation; and FIG. 6A is a fragmentary perspective view of final product.

Specific reference will now be made to the drawings in which similar reference characters are used for corresponding elements throughout.

Figure 1:
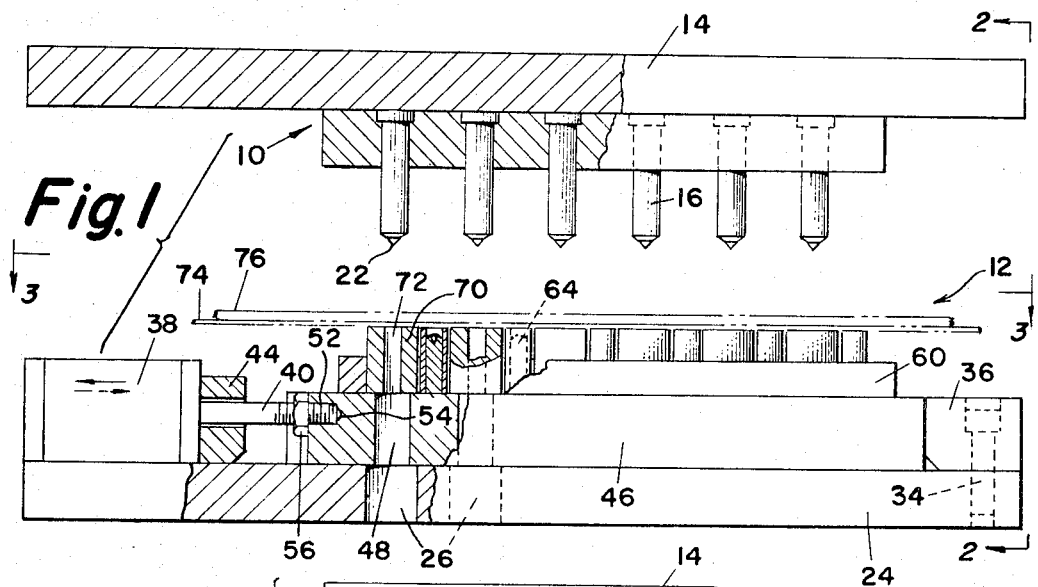
FIG. 1 is a side elevational view of the apparatus with parts broken away and shown in section to disclose details of construction.
Figure 2:
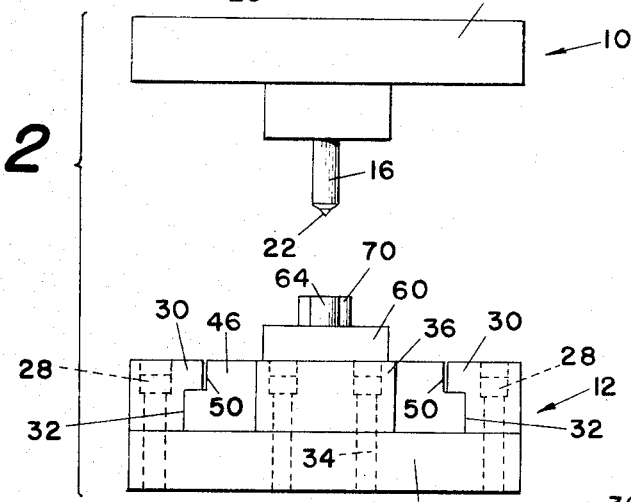
FIG. 2 is an end elevational view looking from the plane of 2—2 on FIG. 1.

The apparatus essentially comprises two members, an upper punch member 10 and a lower combined die and anvil member 12. The upper member comprises an elongated plate 14 supporting a plurality of depending punches 16 which are spaced apart a predetermined distance equal to that desired for the integral rivet connections. It will be seen that the lower or work end of each punch consists of an upper frusto-conical tapered portion 18 and a lower conical portion 20 terminating in a central point 22, see FIG. 5. The punches are carried in a conventional punch press and movable in unison vertically towards and away from the lower member.

The lower member includes an elongated support plate 24 having a plurality of enlarged openings 26 whose centers are spaced apart equally with the spacing of the axes of the punches 16. Secured by appropriate means, such as recessed headed bolts or screws 28 to the upper face of the plate 24 at its sides are elongated guide blocks 30 which are substantially L-shaped in vertical cross-section so that their confronting inner faces are provided with laterally recessed grooves 32. Secured upon the upper face of the support plate 24 at one end thereof by appropriate means, such as recessed headed bolts or screws 34 is a stop block 36. Secured upon the upper face of the support plate 24 at the other end thereof is a hydraulic cylinder 38, controls not shown, in which is slidably mounted a piston on a rod 40 which extends through one end of the cylinder through the horizontal bore 42 of a guide member 44. The rod is extendable and retractable in a horizontal plane substantially parallel to that of the support plate 24 and in a direction towards and away from the stop 36.

A lower die shoe 46 is provided having spaced vertical bores 48 which, in the punch position, are in axial alignment with the holes 26, the sides of said shoe being of vertical step construction, as at 50, to be received in and mate with the grooves 32 of the guide blocks 30. One end of the shoe 46 is provided with an internally threaded bore 52 for receiving the threaded end 54 of the piston rod 40 and locked in place by a nut 56. Thus, the stroke of the piston rod and associated shoe can be readily adjusted as desired.

Figure 3:
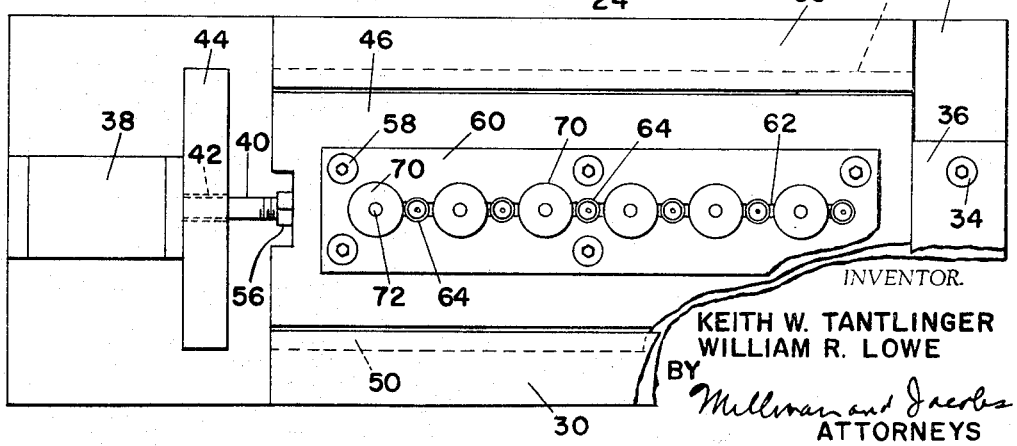
FIG. 3 is a fragmentary top plan view of the die and anvil member and looking from the plane of 3—3 on FIG. 1.

Fixed centrally upon the upper surface of the shoe 46, by appropriate means, such as recessed bolts or screws 58, is an upper shoe or block 60 which is provided with a longitudinal slot 62 consisting of alternate large and small vertical bores, as seen in FIG. 3. Solid anvil members 64 each having an upper spherical crown 66 with a central hole 68 therethrough are inserted in sleeves 69 which are, in turn, inserted in the smaller bores. Between the anvil members are die members 70 which are inserted in the larger bores and are in the form of substantially cylindrical units having vertical bores 72, which in the punch position are in axial alignment with the holes 26, the bores 48 and the punches 16, as seen in FIG. 1. The diameter of each bore 72 is less than that of the punch and approximates the diameter midway between the point 22 and the base of the tapered portion 18.

The operation is as follows: The members 74 and 76 to be joined may be two or more metallic sheets or two or more thicknesses of other members such as the flange of a post and a side panel to be joined thereto in a trailer body construction, as shown in FIGS. 4A and 6A. The metals should be crystalline and ductile. If desired, adhesives or sealants can be interposed between the meeting faces of the metals. If the metals are dissimilar, a coating of anti-electrolytic material may be interposed to suppress electrolytic corrosion.

The members 74 and 76 are juxtaposed with the thicker material on top (where there is a difference in thickness) and placed over the upper shoe or block 60 with the lower die shoe to the right of FIG. 1 against the stop 36. In this position, the punches 16 are in alignment with the bores 72, 48, and 26. The press is then operated so that the punches move vertically and in unison in a predetermined stroke which causes the work end of the punches to strike the upper member 76 at the die openings 72. This forces metal from the member 76 axially into the member 74 causing the latter to be sheared around and into the opening 72 to form a slug 78 which falls through the bores 72 and 48 and thence into the opening 26. At the same time, the material of member 76 is also extruded through the hole 80 formed in the lower member 74 by the removal of the slug 78 and into the upper portion of the die bores or openings 72 as at 82. At this stage, the two members are not joined as the diameter of the extruded portion 82 of the upper member 76 approximates the inner diameter of the bore or die opening 72.

The punches 16 are then retracted. The members 74 and 76 are lifted, either manually or automatically, a sufficient distance so that the extruded metal 82 clears the top of the dies, as shown in FIG. 5. Then cylinder 38 is operated to pull the rod 40 to the left of FIGS. 1 and 3 and until the adjacent end of the lower die shoe 46 strikes the guide member 44 which serves as a stop. The press is then operated to again lower the punches against the members 74 and 76 and in so doing, enter the recesses 84 formed in the upper member and push the members 74 and 76 down against the upper surface of the dies. In this position, the extruded portions 82 are aligned with and enter the cavities 86 in the anvil members 64 above the crowns 66. Continued vertical movement of the punches causes the latter to act as hammers whereby the extruded portions 82 upon impact against the spherical crowns 66 are buttoned, upended, deformed or spread beyond the peripheries of the holes 80 in the lower members, as seen in FIG. 6, to form heads 88 and thereby complete the joints. The hole 68 in the crown 66 insures that the relatively sharp point 22 of the punch does not pierce through the extruded portion 82. The button or head 88 of the resultant integral rivet therefore contains a central protuberance 90 and generally concave portion 92 circumferentially around the protuberance as seen in FIG. 6A. It will be understood that one can correlate the vertical stroke of the punches, the lifting of the superposed members off and on the die and anvil member, and the lateral stroke of the die and anvil member in a timed sequence to increase the efficiency of the operation.

While a preferred embodiment of the invention has here been shown and described, it will be understood that minor variations may be made without departing from the spirit of the invention and the scope of the appended claims. Thus the contours of the working ends of the punches can be altered and the method and apparatus of the instant invention can be used to make integral rivets of the type shown and described in copending application Serial No. 301,734 filed August 13, 1963, now Patent No. 3,216,758.

We claim:

1. A method of joining a pair of upper and lower juxtaposed metallic members by a plurality of spaced integral rivets comprised of providing a plurality of spaced punches and an elongated member having alternate die openings and recessed anvils, the diameters of the die openings being less than the maximum diameters of the punches, the die openings and anvils being spaced apart equally to that of the punches, placing the juxtaposed metallic members across the length of the die and anvil member, moving the punches in unison against the upper metallic member when the punches are aligned with the die openings to cause slugs to be severed from the lower metallic member at the die openings and to extrude material from the upper metallic member through the holes formed by the expulsion of the slugs and into the die openings, retracting the punches, moving the juxtaposed metallic members off the die and anvil member until the extruded material clears the same, shifting the die and anvil member until the anvils are in alignment with the punches, and again moving the punches in unison against the upper metallic member until the latter engages the die and anvil member and continuing the movement of the punches to force the extruded material against the anvils and spread the same beyond the peripheries of the holes formed by the expulsion of the slugs from the lower metallic member.

2. A method of joining a pair of superposed inner and outer metallic members by a plurality of spaced integral rivets comprised of applying a force substantially normal to the outer member in a plurality of spaced zones while back supporting the members on a unit having spaced annular through openings of diameter less than said zones and alternating spaced recesses, the force applied in said plurality of spaced zones being in alignment with said spaced through openings and being sufficient to expel slugs from the inner member into the annular openings while extruding material from the outer member through the holes formed in the inner member and into the through openings, withdrawing the force and the superposed metallic members from the unit, moving the unit in a plane normal to the force until the force zones are aligned with the recesses, and reapplying the force in the same zones until the extruded material enters the recesses and is spread by the impact of the force beyond the peripheries of the holes formed in the inner member.

3. The method of claim 2 wherein each recess includes a convex surface reactive upon the extruded material to spread the same.

4. Apparatus for joining a pair of inner and outer juxtaposed metallic members by a plurality of spaced integral rivets comprised of an elongated member having a plurality of alternately spaced die openings and anvils, a member mounting a plurality of punches spaced conformably to the spacing between the die openings and between the anvils and movable towards and away from the elongated die and anvil member, and means to shift the elongated die and anvil member from a first position where the die openings are aligned with the punches to a second position where the anvils are aligned with the punches, whereby when the juxtaposed metallic members are placed on the elongated die and anvil member and the latter is in said first position, the punches will extrude material from the outer metallic member into the die opening and when the elongated die and anvil member is in the second position, the extruded material is upended by coaction of the punches and anvils.

5. The apparatus of claim 4 wherein the cross-sectional areas of the die openings are less than those of the punches.

6. The apparatus of claim 5 wherein the anvils are recessed beneath the die openings and are convexed towards the punches.

7. The apparatus of claim 6 wherein the working ends of the punches are tapered to a point and the anvils include a central depression to receive the point and prevent the extruded material from being pierced when the punches coact with the anvils to upend the extruded material.

8. The apparatus of claim 4 wherein the punches are movable vertically towards and away from the die and anvil member and the means to shift the die and anvil member includes means mounting the latter for movement in a horizontal plane.

9. The apparatus of claim 8 wherein the means mounting the die and anvil member for movement in a horizontal plane includes an elongated base having stops adjacent their opposite ends which, when engaged by the die and anvil member, selectively provide the first and second shift positions, the die and anvil member being mounted slidably upon the base between the stops, and guide means permitting longitudinal but preventing lateral movement of the die and anvil member relative to the base.

10. The apparatus of claim 9 wherein said base includes vertical openings spaced conformably to the die openings to receive slugs expelled from the inner metallic member at the first position when the die openings are aligned with the punches.

11. The apparatus of claim 9 wherein the means to shift the die and anvil member includes an hydraulically operated horizontally extending rod operatively connected to the die and anvil member.

References Cited by the Examiner
UNITED STATES PATENTS

| | | | |
|---|---|---|---|
| 11,413 | 8/1854 | Carhart | 72—414 |
| 290,229 | 12/1883 | Griest | 29—243.53 |
| 2,323,814 | 7/1943 | Lamb et al. | 29—243.53 |
| 2,713,197 | 7/1955 | Schmidt | 29—522 X |
| 3,216,758 | 11/1965 | Bohlen | 29—432 |

CHARLIE T. MOON, *Primary Examiner.*